(12) United States Patent
Tannenbaum et al.

(10) Patent No.: US 11,620,222 B2
(45) Date of Patent: Apr. 4, 2023

(54) METHODS AND APPARATUS FOR ATOMIC OPERATIONS WITH MULTIPLE PROCESSING PATHS

(71) Applicant: Samsung Electronics Co., Ltd., Suwon-si (KR)

(72) Inventors: David C. Tannenbaum, Austin, TX (US); Raun M. Krisch, Dripping Springs, TX (US); Christopher P. Frascati, Liberty Hill, TX (US)

(73) Assignee: SAMSUNG ELECTRONICS CO., LTD.

( * ) Notice: Subject to any disclaimer, the term of this patent is extended or adjusted under 35 U.S.C. 154(b) by 82 days.

(21) Appl. No.: 17/086,323

(22) Filed: Oct. 30, 2020

(65) Prior Publication Data

US 2022/0066934 A1 Mar. 3, 2022

Related U.S. Application Data

(60) Provisional application No. 63/072,077, filed on Aug. 28, 2020.

(51) Int. Cl.
*G06F 12/08* (2016.01)
*G06F 12/084* (2016.01)

(52) U.S. Cl.
CPC .................................. *G06F 12/084* (2013.01)

(58) Field of Classification Search
CPC .................................................... G06F 12/084
USPC ......................................................... 711/147
See application file for complete search history.

(56) References Cited

U.S. PATENT DOCUMENTS

| 5,983,344 A * | 11/1999 | Henry ................... G06F 9/3824 |
| | | 712/E9.046 |
| 9,501,243 B2 | 11/2016 | Kessler et al. |
| 9,595,075 B2 | 3/2017 | Heinrich et al. |
| 10,649,773 B2 | 5/2020 | Rozario et al. |

(Continued)

FOREIGN PATENT DOCUMENTS

WO 2017019054 A1 2/2017

OTHER PUBLICATIONS

Kubisch, Christoph, "Order Independent Transparency in OpenGL 4.x," GPU Technology Conference, NVIDIA, Mar. 2014, 28 pages, retrieved from http://on-demand.gputechconf.com/gtc/2014/presentations/S4385-order-independent-transparency-opengl.pdf.

*Primary Examiner* — Jae U Yu
(74) *Attorney, Agent, or Firm* — Renaissance IP Law Group LLP

(57) ABSTRACT

A method for performing an atomic memory operation may include receiving an atomic input, receiving an address for an atomic memory location, and performing an atomic operation on the atomic memory location based on the atomic input, wherein performing the atomic operation may include performing a first operation on a first portion of the atomic input, and performing a second operation, which may be different from the first operation, on a second portion of the atomic input. The method may further include storing a result of the first operation in a first portion of the atomic memory location, and storing a result of the second operation in a second portion of the atomic memory location. The method may further include returning an original content of the first portion of the atomic memory location concatenated with an original content of the second portion of the atomic memory location.

19 Claims, 4 Drawing Sheets

(56) References Cited

U.S. PATENT DOCUMENTS

| | | |
|---|---|---|
| 2002/0133682 A1 | 9/2002 | Hansen et al. |
| 2005/0160137 A1* | 7/2005 | Ishikawa ............. H04L 67/2842 |
| | | 711/E12.043 |
| 2009/0094430 A1* | 4/2009 | Bergheaud .............. G06F 9/526 |
| | | 711/163 |
| 2017/0286113 A1 | 10/2017 | Shanbhogue et al. |
| 2019/0324928 A1 | 10/2019 | Brewer |
| 2019/0347759 A1 | 11/2019 | Ray et al. |

* cited by examiner

METHODS AND APPARATUS FOR ATOMIC OPERATIONS WITH MULTIPLE PROCESSING PATHS

CROSS-REFERENCE TO RELATED APPLICATION

This application claims priority to, and the benefit of, U.S. Provisional Patent Application Ser. No. 63/072,077 titled "Atomic Operations with Atomically Maintained Payload Data" filed Aug. 28, 2020 which is incorporated by reference.

TECHNICAL FIELD

This disclosure relates generally to atomic memory operations, and more specifically to methods and apparatus for atomic operations with multiple processing paths.

BACKGROUND

Atomic memory operations may be used to ensure that a process may complete an operation on a shared memory location without interference from other processes that may attempt to access the same memory location at the same time.

The above information disclosed in this Background section is only for enhancement of understanding of the background of the invention and therefore it may contain information that does not constitute prior art.

SUMMARY

A method for performing an atomic memory operation may include receiving an atomic input, receiving an address for an atomic memory location, and performing an atomic operation on the atomic memory location based on the atomic input, wherein performing the atomic operation may include performing a first operation on a first portion of the atomic input, and performing a second operation on a second portion of the atomic input. The method may further include storing a result of the first operation in a first portion of the atomic memory location, and storing a result of the second operation in a second portion of the atomic memory location. The first operation may include a mathematical or logical operation. The second operation may include a buffering operation. The first operation may include a mathematical or logical operation, and the second operation may include a buffering operation. The second operation may include essentially only a buffering operation. The method may further include returning an original content of the first portion of the atomic memory location concatenated with an original content of the second portion of the atomic memory location. The address may include a pointer to the atomic memory location.

An atomic memory operation system may include a data buffer configured to store an atomic input, an address buffer configured to store an address for an atomic memory location, and an atomic operation unit configured to perform an atomic operation on the atomic memory location based on the atomic input stored in the data buffer, wherein the atomic operation unit may include a first processing path configured to perform a first operation on a first portion of the atomic input, and a second processing path configured to perform a second operation on a second portion of the atomic input. The first processing path may be configured to store a result of the first operation in a first portion of the atomic memory location, and the second processing path may be configured to store a result of the second operation in a second portion of the atomic memory location. The first processing path may include an atomic math and logic unit (ALU). The ALU may be configured to perform at least one of: an atomic add, an atomic compare and swap, an atomic swap, an atomic maximum, an atomic minimum, an atomic and, an atomic or, or an atomic exclusive or. The second processing path may include a buffer. The second processing path may include essentially only a buffer. The system may further include a return buffer configured to return an original content of the first portion of the memory location concatenated with an original content of the second portion of the memory location. The second processing path may be substantially simpler than the first processing path. The first and second processing paths may be fabricated on an integrated circuit, and the second processing path may occupy substantially less area on the integrated circuit than the first processing path.

A method of performing atomic operations by a processing unit may include receiving an instruction to perform an atomic operation, receiving a first input, receiving a second input having n bits, receiving a third input having m bits, wherein n and m are non-negative integers, performing the atomic operation using the second input and the third input to generate an intermediate result, and storing the intermediate result at an atomically accessed memory location specified by the first input. The second and third inputs may be provided as an atomically maintained input having (n+m) bits. The first input may be provided as an address pointer to the atomically accessed memory location.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments disclosed herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

DETAILED DESCRIPTION

Overview

Figure 1:
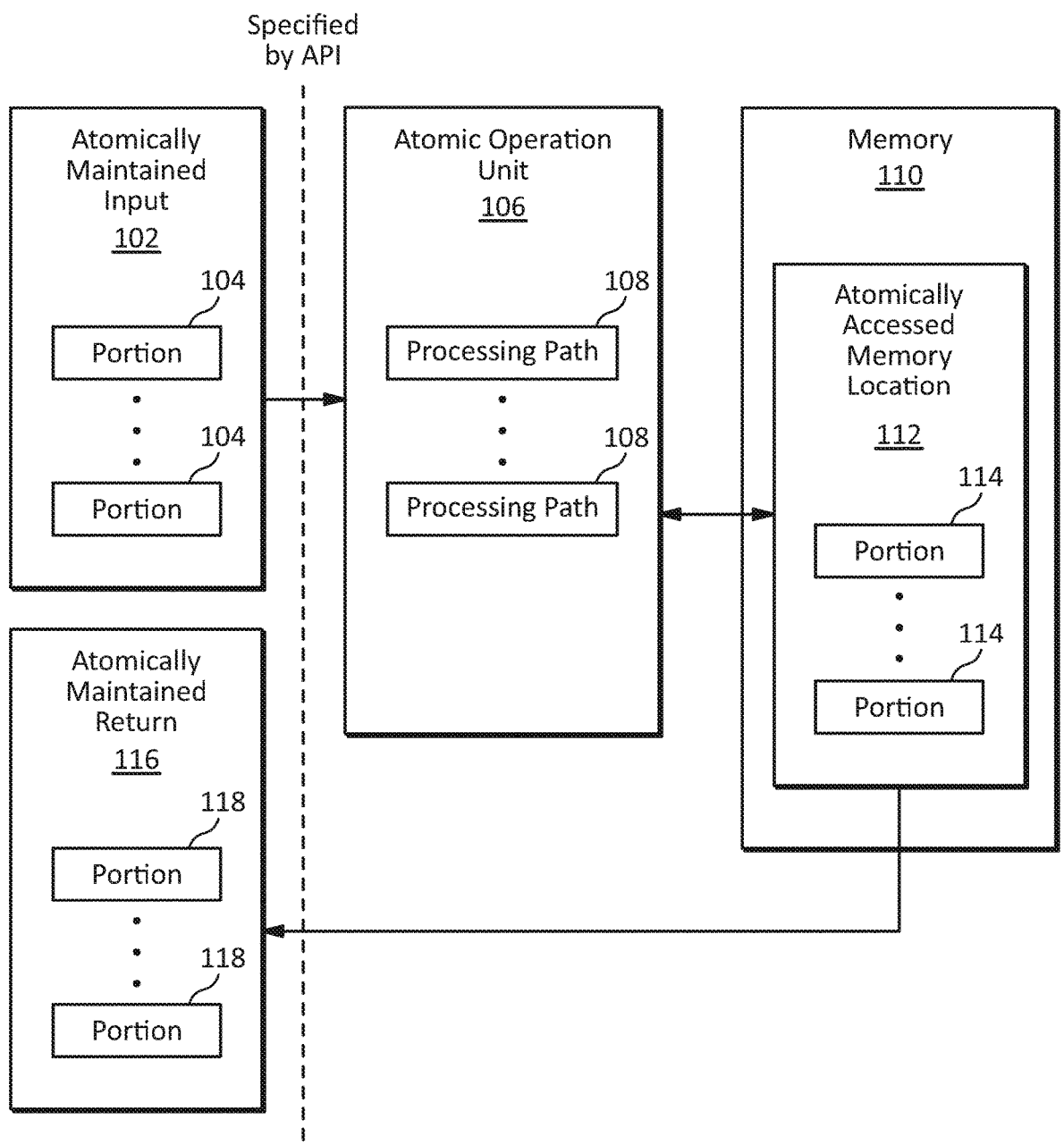
FIG. 1 illustrates an embodiment of a system for performing atomic memory operations according to this disclosure.

Some of the inventive principles relate to atomic memory operations in which different operations may be performed on different portions of an atomically accessed memory location. For example, in some embodiments, an atomic operation unit may receive a 32-bit atomically maintained input which may include, for example, one or more operand portions, one or more payload portions, and/or other portions. The atomic operation unit may use the 32-bit atomically maintained input to perform an atomic operation on a 32-bit memory location, and return a 32-bit return value. Thus, from an outside viewpoint, the operation may be, or appear to be, a full 32-bit atomic operation.

However, hardware in the atomic operation unit may be internally partitioned into two or more different processing paths, for example, one path for the lower 16 bits and one path for the upper 16 bits. The two different paths may implement different numbers and/or types of operations. For example, in some embodiments, the lower path may implement a complete set of atomic arithmetic and logical operations that may be defined by an application programming interface (API) such as OpenGL. DirectX, Vulkan, and/or the like, while the upper path may only implement a smaller subset of atomic operations. As another example, in some embodiments, one or more of the processing paths may only implement a pass-through operation that merely buffers a payload portion of the input and writes it verbatim to the corresponding portion of the memory location.

Depending on the implementation details, partitioning an atomic operation unit into different processing paths may significantly improve the area efficiency, power efficiency, latency, throughput, and/or other attributes of the atomic operation unit, or groups thereof. For example, in some embodiments, an atomic operation unit may include a 16-bit atomic math and logic unit (ALU) to implement arithmetic and/or logical operations on a lower 16-bit operand portion of a 32-bit atomically maintained input and the lower 16-bit portion of an atomically accessed memory location. For the upper 16 bits, however, the atomic operation unit may essentially include only a 16-bit first-in, first-out (FIFO) buffer to pass an upper 16-bit payload portion of the input to the upper 16-bit portion of the memory location. In such an embodiment, the processing path for the upper 16 bits may consume significantly less area and/or power on an integrated circuit (IC) than the processing path for the lower 16 bits. Thus, the total area and/or power consumed by the atomic operation unit may be reduced compared to a unit having a full ALU for each processing path. Moreover, reducing the area and/or power consumption of an atomic operation unit may enable more instances of the unit to be implemented on an IC, thereby reducing the overall latency, and/or increasing the aggregate throughput, of the combined units.

The inventive principles of this disclosure may be applied in any systems that may use atomic memory operations including central processing units (CPUs), graphics processing units (GPUs), neural processing units (NPUs), and/or the like. The processing paths may be used to implement any types of atomic operations including mathematical operations, logical operations, data transfer and/or storage operations, error correction operations, and/or the like.

Atomic memory operations according to this disclosure may be implemented using any number and/or widths of operands, payloads, and/or other portions of atomically maintained inputs, memory locations, return values, and/or the like. Atomic operation units according to this disclosure may be implemented with any number and/or type of data processing paths having any widths. Moreover, atomic memory operations and/or atomic operation units according to this disclosure may be implemented in the context of any type or types of memory hierarchies.

In some embodiments, different data processing paths within an atomic operation unit may be constructed and/or operate completely independently of each other. For example, in some embodiments, different processing paths for different portions of an input, memory location and/or return value may be completely isolated such that any potential carry or overflow from an operation on one portion may not intrude into another portion. In other embodiments, however, different processing paths within an atomic operation unit, and/or between multiple instances of atomic operation units, may be constructed and/or operate, at least partially, in an interrelated manner. For example, in some embodiments, one or more bits of an upper portion of an atomically maintained input and/or memory location may accommodate a carry and/or sign extension from an operation on a lower portion. As another example, in some embodiments, different processing paths may share one or more hardware resources.

Wide Atomic Operations

Atomic memory operations may be used to maintain data integrity, for example, in multi-threaded systems, by allowing only one process at a time to access a shared memory location. In some embodiments, atomic memory operations (which may also be referred to as atomic operations) may be implemented on the natural width and/or alignment of a memory subsystem. Thus, in a 32-bit memory subsystem, each atomically accessed memory location may be 32 bits wide and aligned with the naturally aligned boundaries of the memory subsystem.

Some programs, algorithms, and/or the like, however, may require and/or benefit from the use of atomic operations that are wider than the natural width of the machine and/or memory subsystem on which they may be running. In some embodiments, wider atomic operations may be implemented, for example, using multiple cycle sequences of the existing atomic operation hardware. Such an implementation, however, may result in reduced performance and/or increased power dissipation. In some other embodiments, wider atomic operations may be accommodated by scaling up the atomic operation hardware to operate on wider operands and/or memory locations. Such embodiments, however, may consume excessive amounts of area and/or power, especially in highly parallel systems such as GPUs where there may be many instances of each atomic operation unit. Moreover, the area and/or power costs associated with wide atomic operation units may be largely wasted in applications where wide atomic operations may be used infrequently.

Multiple Processing Paths

Some of the inventive principles of this disclosure are based on the observation that, even though a program or algorithm may request a relatively wide atomic operation, in some situations, one or more portions of the atomic operation may require significantly less processing time, area, power, and/or the like, than other portions. For example, an atomic operation unit may receive an instruction with a 64-bit atomically maintained input to operate on a 64-bit atomically accessed memory location. However, the 64-bit input may include a 32-bit operand portion that may be used for a numerical operation, and a 32-bit payload portion that may only need to be stored in memory with little or no modification.

Since only the 32-bit operand portion may involve significant processing, this instruction may be handled by an embodiment of an atomic operation unit having a first path constructed to perform a numerical atomic operation (e.g., using an ALU), and a second path constructed to perform a pass-through operation (e.g., using a FIFO buffer). In some embodiments, this may enable a relatively wide atomic memory operation to be implemented at a lower area and/or power cost than an embodiment having a full 64-bit wide ALU. Moreover, in some embodiments, this may enable the effective width of an existing atomic operation unit to be increased (e.g., doubled) by adding a second, relatively simple, processing path at a relatively low additional area and/or power cost, and/or with little or no additional latency.

Some example embodiments of systems, processes, methods, features, techniques and/or the like illustrating some possible implementation details according to this disclosure are described above and below. These examples are provided for purposes of illustrating the principles of this disclosure, but the principles are not limited to these implementation details. For example, some embodiments may be described in the context of GPUs and having specific numbers, types, and/or widths of operands, payloads, memory locations, return values, processing paths, components, and/or the like, but other embodiments according to this disclosure may be realized in other contexts and with other implemented details.

FIG. 1 illustrates an embodiment of a system for performing atomic memory operations according to this disclosure. The system illustrated in FIG. 1 may receive an atomically maintained input 102 which may include two or more portions 104. The atomically maintained input 102 may be used by an atomic operation unit 106, which may include two or more processing paths 108, to perform an atomic operation on an atomically accessed memory location 112. The atomically accessed memory location 112 may be located in memory 110 and may include two or more portions 114. (For convenience, the atomically maintained input 102 may also be referred to as an atomic input, and the atomically accessed memory location 112 may also be referred to as an atomic memory location.) In some embodiments, the original contents of the atomic memory location 112 may be returned as an atomically maintained return 116, which may include two or more portions 118. Though not illustrated in FIG. 1, in some embodiments, a memory subsystem may facilitate the transfer of data to and/or from the atomic operation unit 106 and/or the memory 110.

The atomic input 102, atomic operation unit 106, atomic memory location 112, and/or atomically maintained return 116 may be implemented with any number and/or widths of portions and/or paths 104, 108, 114, and 118, respectively.

Examples of operations that may be performed by the processing paths 108 may include mathematical (e.g., arithmetic) operations, logical operations, data transfer and/or storage operations, and/or the like, and/or hybrid combinations thereof. Examples of mathematical operations may include add, subtract, multiply, divide, arithmetic shift, increment, decrement, carry, overflow, sign extension, determining a minimum, determining a maximum, and/or the like. Examples of logical operations may include AND, OR, exclusive-OR (XOR), logical shift, and/or the like. Examples of data transfer and/or storage operations may include pass-through operations, buffering operations, swap (also referred to as exchange) operations, and/or the like. Examples of hybrid logic/transfer operations may include compare-and-swap (also referred to as compare-and-exchange) operations, and/or the like. In some embodiments, an operation performed by one of the processing paths 108 may be to simply ignore or discard a portion of an atomic input.

In some embodiments, each of the processing paths 108 may use a corresponding portion 104 of the atomic input 102 to perform an operation on a corresponding portion 114 of the atomic memory location 112. Likewise, in some embodiments, the original contents of each portion 114 of the atomic memory location 112 may be returned as the value of the corresponding portion 118 of the atomically maintained return 116. Thus, in some embodiments, there may be a one-to-one correspondence between the portions of each data structure and processing paths, and the different data processing paths may be constructed and/or operate independently of each other.

Alternatively, in some embodiments, one processing path may be used with multiple portions of data structures, and/or one portion of a data structure may be processed by multiple processing paths. Moreover, in some embodiments, there may be overlap between portions of data structures and/or processing paths. Thus, in some embodiments, the processing paths 108 may be constructed and/or operate, at least partially, in an interrelated manner.

In some embodiments, data crossing the dashed line may be transferred through, or directed by, an API. For example, input and/or output data, or an address of data, may be passed as an argument to a function call for an atomic operation. Additionally, data may be passed as the return value of a function call for an atomic operation. As another example, the source and/or destination of data used by an atomic operation (e.g., to and/or from a shader engine of a GPU) may be specified as an argument to, or implicitly in, a function call for an atomic operation.

The atomic operation unit 106, and/or portions 108 thereof, may be implemented with hardware, software (which may include firmware), or any combination thereof. Some embodiments may be implemented entirely or primarily in hardware and may include, for example, circuitry such as combinational and/or sequential logic including multiplexers, switches, latches, flops, registers, gates, inverters, counters, timers, state machines, gate arrays, and/or the like in any suitable form including discrete components, integrated circuits (ICs), programmable logic devices (PLDs), complex programmable logic devices (CPLDs), field programmable gate arrays (FPGAs), application specific integrated circuits (ASICS), and/or the like. Some embodiments may be implemented partially or primarily with software, for example with a processor executing instructions which may be stored in memory, and including front-end hardware to interface with other hardware in the system.

Although the components illustrated in FIG. 1 may be shown as distinct components, in some embodiments, any or all of the components may be integrated with, and/or distributed between, any of the other components illustrated in FIG. 1 and/or any other components in a system in which it may be implemented. Moreover, in some embodiments, some of the components illustrated separately in FIG. 1 may be implemented as a single component. For example, two or more of the processing paths 108 may be implemented with a single unit that may be run sequentially, but in different modes, for different portions 104 of the atomic input 102. In some embodiments, this may reduce overall power dissipation because, for example, for one or more of the portions 104, there may be a mode that operates at lower power than for other portions.

The memory 110 may be implemented with any type of memory such as, for example, CPU system memory, GPU memory, cache memory, tightly coupled memory, and/or the like, using any memory technology including volatile memory of any type such as static random access memory (SRAM), dynamic random access memory (DRAM), non-volatile memory of any type such flash memory, persistent memory, and/or the like.

Programming Interface

The following is an example embodiment of a function declaration for an atomic add operation according to this disclosure:

int atomicAddWithPayload(inout int mem,
    int data_hi, data_low);

where mem may be a pointer to an atomically accessed memory location having a width of n+m bits, data_low may be an n-bit operand that may be used for an atomic arithmetic add operation on the lower n bits of the atomic memory location, and data_hi may be an m-bit payload that may be stored verbatim in the upper m bits of the atomic memory location.

In some embodiments, this atomic add function declaration may be implemented by introducing the data_hi payload argument into an existing function declaration for an atomic operation. Function declarations for other mathematical, logical, and/or data transfer functions, and/or hybrid combinations thereof according to this disclosure, may similarly be implemented by adding a payload or other additional argument to an existing function declaration for an atomic operation. Thus, in some embodiments, a programming model for atomic memory operations having multiple processing paths according to this disclosure may be similar to existing programming models, which may thereby make adoption easier.

The following pseudocode illustrates an example implementation of an atomic add operation for the atomic add function declaration provided above, where n=m=32:

unsigned int32 payload //payload to be stored at memory location
    int32 atomic_operand //operand to be added automatically
    int64 *address //memory location to be modified automatically
    int64 rtn=Atomic_add(address, concat(payload, atomic_operand))

In some embodiments, the result of this sequence may be that the atomic memory location pointed to by address may be modified to contain payload in the high 32 bits and the sum of atomic_operand plus the low-order 32 bits of the atomic memory location pointed to by address, in which any potential carry may not intrude into the high-order 32 bits. In some embodiments, return value of the function may be the original 64-bit contents of the atomic memory location pointed to by address. In some alternative embodiments, the function may return a null or undefined value, for example, if the original 64-bit contents of the atomic memory location is not needed by the calling code sequence.

Although the address pointer *address to the atomic memory location is shown as a 64-bit value, this is only provided as an example, and is unrelated to the widths of the operands used throughout the function. The address or address pointer may be implemented with any width, and the addressing used to access the atomic memory location may be implemented with any type of physical address space, logical address space, address translation, memory hierarchy, address cache structure, and/or the like. Thus, in some embodiments, the addressing of an atomic memory location may be completely independent of the atomic memory operation performed thereon.

Additional Embodiments

Figure 2:
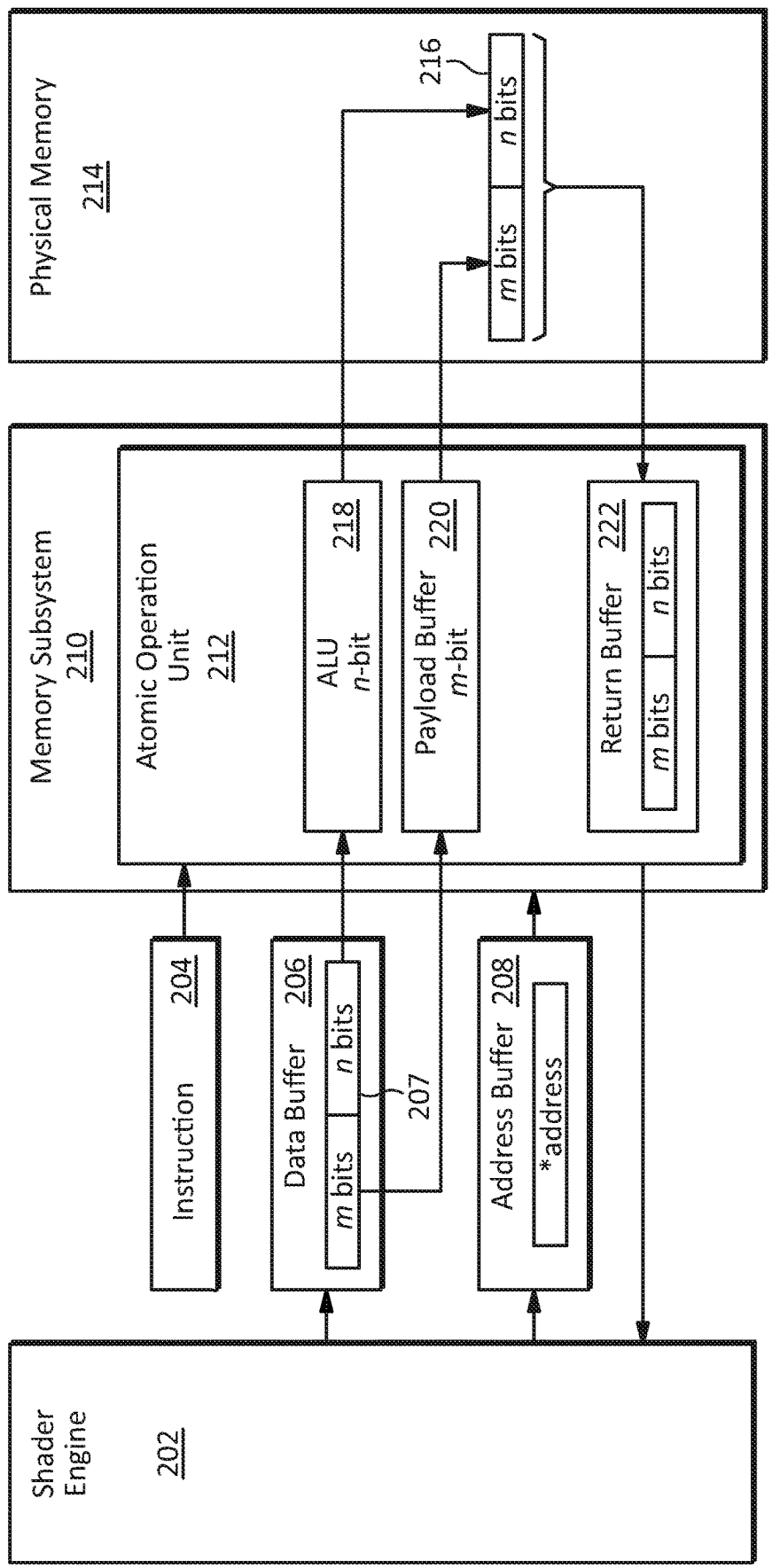
FIG. 2 illustrates an example embodiment of a system for performing atomic memory operations according to this disclosure.

FIG. 2 illustrates an example embodiment of a system for performing atomic memory operations according to this disclosure. The embodiment illustrated in FIG. 2 may be used, for example, to implement an atomic add operation that may be used with the function declaration and/or pseudocode described above, but the inventive principles are not limited to those details. Moreover, for purposes of illustrating some of the principles of this disclosure, the embodiment of FIG. 2 is illustrated in the context of a GPU having a shader engine, data structures and components having specific bit widths, and other implementation details, but the inventive principles are not limited to these details.

The system illustrated in FIG. 2 may include a shader engine 202, an instruction queue 204, a data buffer 206, an address buffer 208, a memory subsystem 210 having an atomic operation unit 212, and a physical memory 214.

The data buffer 206 may be implemented, for example, as a FIFO memory and may store an atomically maintained input (atomic input) 207 having an n-bit lower portion and an in-bit upper portion. In some embodiments, the portions may be operands, payloads, and/or the like for atomic operations. In this example embodiment, the n-bit lower portion may be an operand for an arithmetic or logical operation, and the n-bit upper portion may be a data payload. The address buffer 208 may store an address of any width in the form of a pointer or any other format to access an atomically accessed memory location (atomic memory location) 216 in the physical memory 214.

The memory subsystem 210 may provide access to the physical memory 214. The atomic operation unit 212 may be implemented as part of the memory subsystem 210, but in other embodiments, it may be a completely or partially separate component.

The atomic operation unit 212 may include a first processing path in the form of an n-bit ALU 218 that may perform atomic arithmetic and/or logical operations on the lower n-bit portion of the atomic input 207. The atomic operation unit 212 may also include a second processing path in the form of an m-bit buffer 220 that may store the upper n-bit payload portion of the atomic input 207. In some implementations, since there may be a finite propagation delay through the ALU 218, the buffer 220 may store the payload portion to equalize the latency through both paths. The outputs from the ALU 218 and the buffer 220 may be concatenated and stored in a lower n-bit portion and an upper in-bit portion of the atomic memory location 216.

In some embodiments, the atomic operation unit may include a return buffer 222 which may return the original contents of the low n-bit and high in-bit portions of the atomic memory location 216 prior to the atomic operation as a return value.

In the example embodiment illustrated in FIG. 2, the data buffer 206, address buffer 208, and/or return buffer 222 may interact with the shader engine 202, which may be implemented as a graphics shader, a computer shader, and/or the like. In other embodiments, however, the atomic memory operation system illustrated in FIG. 2 may operate in support of any other apparatus, processes, and/or the like. The components illustrated in FIG. 2 may be implemented in hardware, software, or any combination thereof as described above with respect to the embodiment illustrated in FIG. 1.

Although the system illustrated in FIG. 2 is not limited to any particular implementation details, in some example implementations, the n-bit and m-bit portions of the atomic input 207 and the atomic memory location 216, as well as the buffers 206, 220 and 222, may have a width of 32 bits (e.g., n=m=32). In some embodiments, a system such as that illustrated in FIG. 2 may be implemented by essentially adding an m-bit payload buffer 220 to an existing n-bit system, increasing the width of an existing n-bit data buffer (and optionally an existing n-bit return buffer) to accommodate the m-bit payload portion, and modifying control logic in the atomic operation unit to support the larger atomic operation. Thus, in some embodiments, an n-bit atomic operation system may be transformed to an (n+n)-bit atomic operation system with the addition of a relatively small amount of hardware and with little or no additional latency.

In some embodiments, and depending on the implementation details, this transformation may provide an area savings for the two processing paths of about n/(n+m) compared to an embodiment having, for example, a full (n+m)-bit ALU. This savings may be reduced by the amount of logic that may be used to equalize the latency through the second path (e.g., a buffer). Thus, in an embodiment in which n=m=32, the area savings may initially be about 32/(32+32)=50 percent, but then reduced to about a 30-40 percent savings after considering the logic used in the second processing path. Moreover, in some embodiments, this transformation may enable additional area savings, for example, by reducing or eliminating buffering logic in enqueuing structures that may maintain outstanding requests and may be sized proportional to the latency of an atomic operation.

In some embodiments, the m-bit portions of the system illustrated in FIG. 2 may be implemented to accommodate other data types, for example, vec4 which may contain a 4-dimensional vector of floating point data (e.g., 4×32 bits per component=128 bits), while the n-bit portions continue to process a 32-bit numerical operand.

Some additional inventive principles of this disclosure relate to the use of clock gating techniques. For example, in some embodiments, if none, or only a portion, of the return data from an atomic operation as described above may be used by a program that issued an instruction for the operations, some or all of the return data path may be disabled through clock gating to reduce power consumption. In some embodiments, the clock gating may be controlled, for example, by one or more flags in logic in the atomic operation unit 212.

Figure 3:
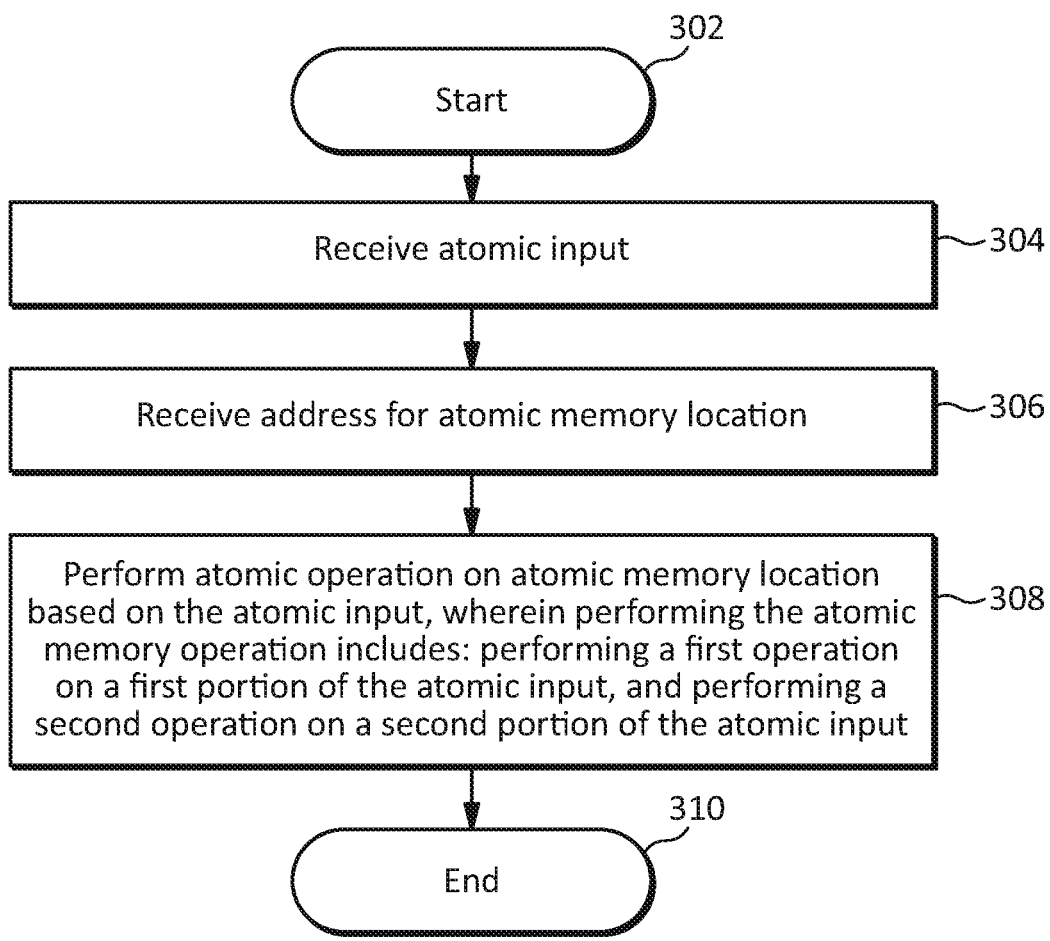
FIG. 3 illustrates an embodiment of a method for performing atomic memory operations according to this disclosure.

FIG. 3 is a flow chart illustrating an embodiment of a method for performing an atomic memory operation according to this disclosure. The method illustrated in FIG. 3 may be used, for example, with any of the systems illustrated in FIGS. 1 and 2. The method may start at operation 302. At operation 304, the method may receive an atomic input. At operation 306 the method may receive an address for an atomic memory location. At operation 308, the method may perform an atomic operation on the atomic memory location based on the atomic input, wherein performing the atomic operation may include: performing a first operation on a first portion of the atomic input; and performing a second operation on a second portion of the atomic input. The method may terminate at operation 310.

The operations and/or components described with respect to the embodiment illustrated in FIG. 3, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied. For example, in some embodiments, operations 304 and 306 may occur simultaneously.

Figure 4:
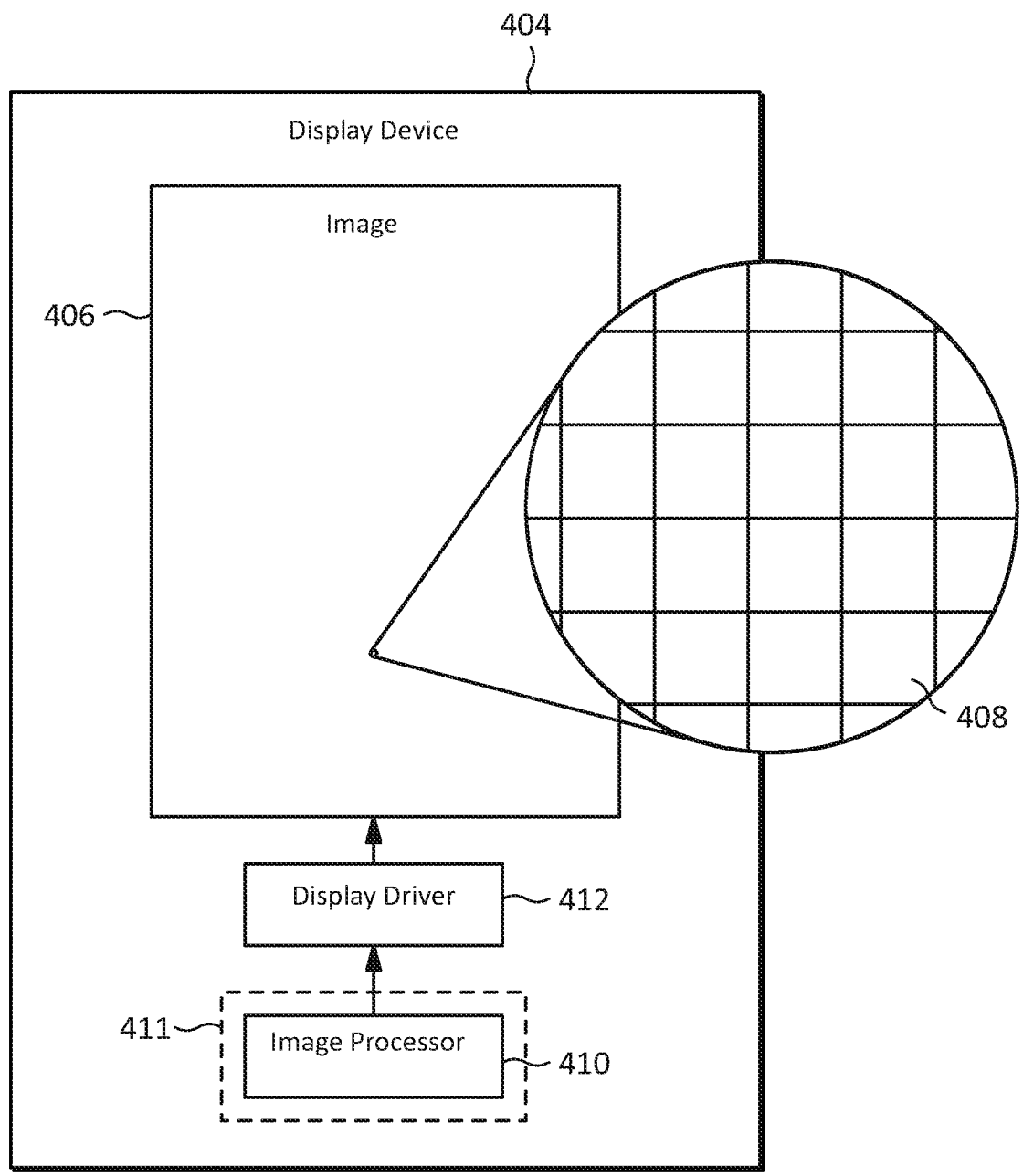
FIG. 4 illustrates an embodiment of an image display device into which any of the methods or apparatus described in this disclosure may be integrated.

FIG. 4 illustrates an embodiment of a display device 404 into which any of the methods or apparatus described in this disclosure may be integrated. The display device 404 may have any form factor such as a panel display for a PC, laptop, mobile device, etc., a projector, VR goggles, etc., and may be based on any imaging technology such as cathode ray tube (CRT), digital light projector (DLP), light emitting diode (LED), liquid crystal display (LCD), organic LED (OLED), quantum dot, etc., for displaying a rasterized image 406 with pixels. An image processor 410 such as graphics processing unit (GPU) and/or display driver circuit 412 may process and/or convert the image to a form that may be displayed on or through the display device 404. A portion of the image 406 is shown enlarged so pixels 408 are visible. Any of the methods or apparatus described in this disclosure may be integrated into the imaging device 404, image processor 410, and/or display driver circuit 412 to generate pixels 408 shown in FIG. 4, and/or groups thereof. In some embodiments, the image processor 410 may include a graphics pipeline that may implement one or more atomic operations and/or any of the other inventive principles described herein, which may be implemented, for example, on an integrated circuit 411. In some embodiments, the integrated circuit 411 may also include the display driver circuit 412 and/or any other components that may implement any other functionality of the display device 404.

This disclosure encompasses numerous inventive principles relating to atomic memory operations. These principles may have independent utility and may be embodied individually, and not every embodiment may utilize every principle. Moreover, the principles may also be embodied in various combinations, some of which may amplify the benefits of the individual principles in a synergistic manner.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element.

The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Various organizational aids such as section headings and the like may be provided as a convenience, but the subject matter arranged according to these aids and the principles of this disclosure are not limited by these organizational aids.

Since the inventive principles of this patent disclosure may be modified in arrangement and detail without departing from the inventive concepts, such changes and modifications are considered to fall within the scope of the following claims.

The invention claimed is:

1. A method for performing an atomic memory operation, the method comprising:
   receiving an atomic input;
   receiving an address for an atomic memory location; and
   performing, by a process, an atomic operation on the atomic memory location based on the atomic input;
   wherein performing the atomic operation comprises:
      performing a first operation on a first portion of the atomic input using a first processing path that is configured to access a first physical portion of the atomic memory location; and
      performing a second operation on a second portion of the atomic input using a second processing path that is physically separate from the first processing path and that is configured to access a second physical portion of the atomic memory location independent of the first processing path, wherein the second physical portion is separate from the first physical portion; and
   wherein the atomic operation is performed without another process accessing the atomic memory location.

2. The method of claim 1, further comprising:
   storing a result of the first operation in the first physical portion of the atomic memory location using the first processing path; and
   storing a result of the second operation in the second physical portion of the atomic memory location using the second processing path.

3. The method of claim 1, wherein the first operation comprises a mathematical or logical operation.

4. The method of claim 1, wherein the second operation comprises a buffering operation.

5. The method of claim 2, further comprising returning an original content of the first physical portion of the atomic memory location concatenated with an original content of the second physical portion of the atomic memory location.

6. The method of claim 1, wherein the address comprises a pointer to the atomic memory location.

7. The method of claim 1, wherein the first operation has a first latency and the second operation has a second latency separate from the first latency, and wherein performing the atomic operation further comprises:
   equalizing the first and the second latencies during the atomic operation using the second processing path.

8. An atomic memory operation system comprising:
   a data buffer configured to store an atomic input;
   an address buffer configured to store an address for an atomic memory location; and
   an atomic operation unit configured to perform an atomic operation on the atomic memory location based on the atomic input stored in the data buffer;
   wherein the atomic operation unit comprises:
      a first processing path configured to perform, by a process, a first operation on a first portion of the atomic input and further configured to access a first physical portion of the atomic memory location; and
      a second processing path that is physically separate from the first processing path and configured to perform, by the process, a second operation on a second portion of the atomic input, wherein the second processing path is further configured to access a second physical portion of the atomic memory location independent of the first processing path, and wherein the second physical portion is separate from the first physical portion; and
   wherein the atomic operation unit is configured to perform the atomic operation without another process accessing the atomic memory location.

9. The system of claim 8, wherein:
   the first processing path is configured to store a result of the first operation in the first physical portion of the atomic memory location; and
   the second processing path is configured to store a result of the second operation in the second physical portion of the atomic memory location.

10. The system of claim 8, wherein the first processing path comprises an atomic math and logic unit (ALU).

11. The system of claim 10, wherein the ALU is configured to perform at least one of: an atomic add, an atomic compare and swap, an atomic swap, an atomic maximum, an atomic minimum, an atomic AND, an atomic OR, or an atomic exclusive OR (XOR).

12. The system of claim 10, wherein the second processing path comprises a buffer.

13. The system of claim 9, further comprising a return buffer configured to return an original content of the first physical portion of the atomic memory location concatenated with an original content of the second physical portion of the atomic memory location.

14. The system of claim 8, wherein:
   the first and second processing paths are fabricated on an integrated circuit; and
   the second processing path occupies less area on the integrated circuit than the first processing path.

15. The system of claim 8, wherein the first operation has a first latency and the second operation has a second latency separate from the first latency, and wherein the second processing path is configured to equalize the first and the second latencies during the atomic operation.

16. A method of performing atomic operations by a processing unit, the method comprising:
   receiving an instruction to perform an atomic operation;
   receiving a first input;
   receiving a second input having n bits;
   receiving a third input having m bits, wherein n and m are non-negative integers;
   performing, by a process, the atomic operation using the second input and the third input to generate an intermediate result, wherein performing the atomic operation comprises:
      performing a first operation on the second input using a first processing path that is configured to access a first physical portion of an atomically accessed memory location specified by the first input, and
      performing a second operation on the third input using a second processing path that is physically separate from the first processing path and that is configured to access a second physical portion of the atomically accessed memory location independent of the first processing path, wherein the second physical portion is separate from the first physical portion; and
   storing the intermediate result at the atomically accessed memory location specified by the first input, wherein the intermediate result comprises a first result of the first operation and a second result of the second operation, and wherein storing the intermediate result includes:
      storing the first result in the first physical portion of the atomically accessed memory location using the first processing path, and storing the second result in the second physical portion of the atomically accessed memory location using the second processing path;

wherein the storing of the intermediate result is performed without another process accessing the atomically accessed memory location.

17. The method of claim 16, wherein the second and third inputs are provided as an atomically maintained input having (n+m) bits.

18. The method of claim 16, wherein the first input is provided as an address pointer to the atomically accessed memory location.

19. The method of claim 16, wherein the first operation has a first latency and the second operation has a second latency separate from the first latency, and wherein performing the atomic operation further comprises:

equalizing the first and the second latencies during the atomic operation using the second processing path.

* * * * *